UNITED STATES PATENT OFFICE.

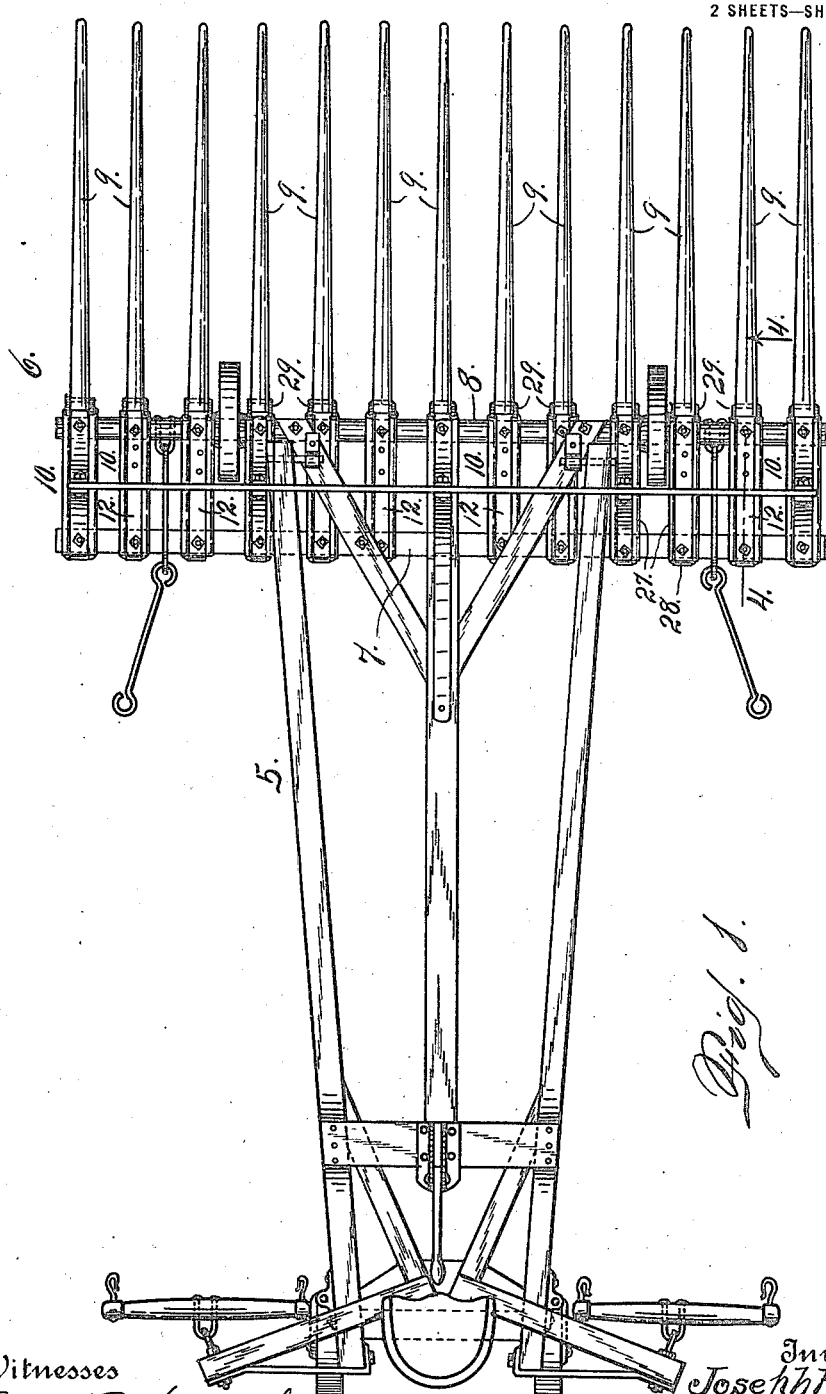

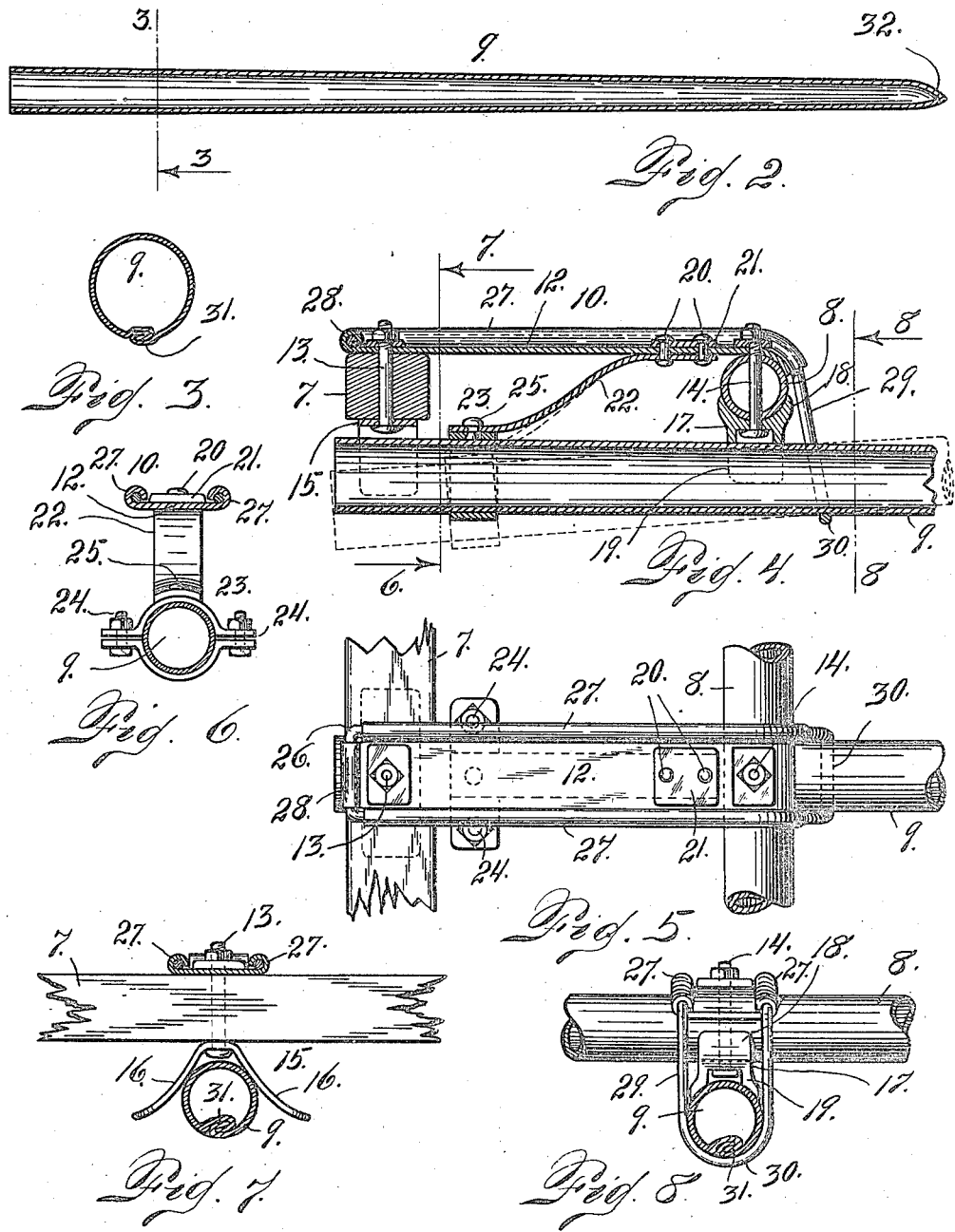

JOSEPH H. COPE, OF WINDSOR, COLORADO.

SWEEP-RAKE.

1,269,393.

Specification of Letters Patent. Patented June 11, 1918.

Application filed December 26, 1914. Serial No. 879,222.

*To all whom it may concern:*

Be it known that I, JOSEPH H. COPE, a citizen of the United States, residing at Windsor, county of Weld, and State of Colorado, have invented certain new and useful Improvements in Sweep-Rakes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates generally to improvements in sweep rakes, but more especially to a special construction of tooth for use in connection with these rakes. Specifically, the tooth is composed of sheet metal and formed hollow, the material employed giving the tooth sufficient rigidity for the purpose. An important feature of the invention consists in the construction whereby teeth of this character are secured to the rake head or the forward portion of the rake. The rear extremities of these teeth are connected with the rake head in such a manner as to permit the forward portions of the teeth to move upwardly as well as laterally in either direction. This is an important feature, since it is highly desirable where a metal tooth is employed, that the latter have sufficient movement to avoid as far as possible any tendency to bend the tooth. To this end, the rear extremity of each tooth is connected with the rake head by a special shackle whose forward extremity passes around the rake tooth forward of the head in such a manner as to form a fulcrum to permit both lateral and vertical movement, while the portion of the shackle in the rear of its forward extremity includes a spring extending downwardly and connected with the rake tooth near the rear extremity of the latter. This spring, while it has a tendency to support the rake tooth in its normal position, allows for a limited degree of both vertical and lateral oscillation upon the forward part of the shackle as a fulcrum.

It should be understood that my improved shackle construction for connecting or securing the rake teeth to the head in such a manner as to permit the aforesaid communication, is equally applicable to specific forms of teeth other than that herein illustrated and described.

Having briefly outlined my improved construction, I will proceed to describe the same in detail, reference being made to the accompanying drawing. In this drawing,—

Figure 1 is a top plan view of a sweep rake equipped with my improvement.

Fig. 2 is a detail sectional view of my improved rake tooth.

Fig. 3 is a cross section taken on the line 3—3, Fig. 2.

Fig. 4 is a section taken on the line 4—4, Fig. 1, viewed in the direction of the arrow, the parts being shown on a larger scale.

Fig. 5 is a top plan view of the construction shown in Fig. 4.

Fig. 6 is a section taken on the line 6—7, Fig. 4, looking toward the right.

Fig. 7 is a section taken on the same line looking toward the left.

Fig. 8 is a section taken on the line 8—8, Fig. 4, looking toward the left.

The same reference characters indicate the same parts in all the views.

Let the numeral 5 designate a sweep rake in its entirety, and 6 the head of this rake. As illustrated in the drawing, the rake head includes a rearwardly located bar 7 and a forwardly located bar 8. The forwardly located bar is preferably composed of a metal tube. Each rake tooth 9 is connected with the rake head in a manner which will now be described. This connection consists of what I will term a shackle 10 comprising a metal plate 12, which is secured to the bars 7 and 8 by means of bolts 13 and 14, which pass through the bars 7 and 8 respectively, and also through the plate 12. The bolt 13 forms a support for a guide bracket 15, which extends beyond the bar 7 and flares outwardly on opposite sides, as shown at 16. The rear portion of the rake tooth 9 engages this guide bracket which permits a limited degree of lateral as well as vertical movement while still maintaining the tooth in its proper position. The bolt 14 also forms a support for a bracket 17, whose upper portion 18 is curved to fit the tubular member 8 and whose lower portion 19 is curved to fit the upper curved surface of the rake tooth 9. If desired to obtain a freer lateral movement the bracket 17 may be omitted entirely, or the lower portion 19 thereof may be constructed on a larger arc, somewhat like that of the bracket 15. Secured to the plate 12 of the shackle by means of rivets 20 or other suitable fastening devices, and a reinforcing plate 21, is the forward extremity of a spring 22, whose rear extremity extends downwardly and rearwardly from its forward extremity, and is secured to the rear portion of the rake tooth through the instrumentality of a reinforcing collar 23, which is clamped to the rake tooth by means of bolts 24; and a suitable fastening device 25, as a rivet. The plate 12 is reinforced at its side and rear edges by means of a relatively heavy wire or rod 26, the metal of the plate being bent around the said wire at the sides as shown at 27, and at the rear end, as shown at 28, the forward portion of this wire or rod extends downwardly as shown at 29, and underneath the rake tooth forward of the head as shown at 30, this underneath part forming a fulcrum for the rake tooth to permit vertical and lateral oscillation, as heretofore explained.

Where the rake tooth is composed of metal (see Figs. 2 and 3), it is preferred to form the same of sheet metal, which is bent to approximately the cylindrical form, the edges being interlocked as shown at 31 and pressed tightly together, forming a sort of seam joint. A tooth of this character is preferably largest at its rear extremity and tapers forwardly, its forward end being pointed, as shown at 32. While the aforesaid specific construction of tooth is illustrated, it must be understood that the invention is not limited to this specific manner of forming, or this precise construction of the tooth. While the metal form of tooth is herein claimed, it must be understood that my improved fastening means or shackle for connecting the tooth to the rake head may be advantageously used with rake teeth formed of other material, though the metallic tooth is believed preferable.

While I have described a single tooth and the manner of connecting the same with the rake head, it must be understood that all of the teeth are substantially identical in construction and this is also true of the means for connecting the same with the rake head. Hence, the description of a single tooth and the shackle construction whereby it is secured to the rake head, is sufficient for the purpose of this specification.

In the use of a rake (see Fig. 1) having teeth of the construction herein described and connected with the rake head as herein disclosed, it will be understood that whenever occasion arises, as when a rake tooth encounters an obstruction, the forward portion of the tooth may move upwardly and its rear portion beyond the fulcrum move downwardly, as indicated by the dotted lines in Fig. 4. Furthermore, any tooth may oscillate laterally within reasonable limits, but will always be returned to its normal position as soon as the obstacle requiring such special movement, shall have been passed or moved aside.

It is believed that a sweep rake equipped with teeth of the construction described and connected with the rake head in the manner disclosed will prove exceedingly efficient in operation, and durable in use.

Attention is called to the fact that a metal rake tooth of the construction herein described will be absolutely rigid and it is for this reason necessary that it should have a flexible connection with the rake head, otherwise, that is to say, if the tooth were rigidly connected with the rake head, should a single tooth strike an obstruction and be raised, the entire rake head must be raised, thus placing undue strain upon the particular tooth which engages the obstruction. For instance, if a single tooth rides upwardly on a stone or other hard support, instead of yielding, it remains rigid and consequently must raise the whole rake head. In so doing, the tooth engaging the obstruction will either be broken or subjected to such a strain as may distort it, or bend it out of shape. However, by making provision for flexibly connecting each tooth with the rake head independently of each other tooth, if a single tooth engages an obstruction, it may move upwardly and pass over the same, while the other teeth remain in their normal position.

It should also be explained that my improved metallic tooth may be employed to equal advantage in connection with the heads of hay stackers and other similar hay tools. However, when employed in the hay stacker, the flexible connection might be employed or not, as desired.

Having thus described my invention, what I claim is,—

1. A sweep rake whose teeth are movably connected with the head to permit both vertical and lateral oscillation, the movement of the teeth being independent of one another.

2. In a rake the combination with the rake head, of a tooth yieldably connected therewith to permit both vertical and lateral oscillation, independently of the rake head and of the other teeth.

3. The combination with a rake head, a tooth, and a shackle for connecting the tooth with the head, said shackle including a loop extending underneath the tooth in front of the head, the tooth being loosely mounted in the loop and yieldable means for connecting the tooth to the head in the rear of the loop.

4. The combination with the relatively stationary framework of the rake head, of a tooth whose rear portion extends underneath said framework, a shackle applied to the top of said framework and including a forward loop through which the rake tooth passes, the tooth being loosely mounted in the loop and a spring connected with the tooth in the rear of the loop.

5. In a sweep rake, the combination with the relatively stationary body part of the rake head and the teeth, of means for connecting each tooth with the head, said means comprising a shackle including a forwardly located fulcrum on which the tooth is loosely mounted and a spring in the rear thereof, said spring being connected with the tooth and body part.

6. The combination with the teeth and a relatively stationary body part of the rake head, including transversely arranged front and rear bars, of means for connecting each tooth with the said body, said means comprising brackets mounted on the bars, extending downwardly therefrom and forming top bearings and guides for the tooth, a shackle including a top plate, a spring connected with the plate at one extremity, extending downwardly and rearwardly therefrom, its opposite extremity being secured to the tooth, and a forwardly located fulcrum supporting the tooth from below.

7. The combination with the teeth and the relatively stationary body part of the rake head, including transversely arranged front and rear bars, of means for connecting each tooth with said body, said means comprising brackets mounted on the bars, extending downwardly therefrom and forming top bearings and guides for the tooth, the rear bracket having arms diverging laterally as they extend downwardly, and a shackle including a top plate secured to said bars, a spring secured to said plate and to the tooth, and a rod mounted on the plate and extending underneath the tooth forwardly of the front bar and constituting a fulcrum for the tooth.

8. The combination with the teeth and the relatively stationary body part of the rake head, including transversely arranged front and rear bars, of means for connecting each tooth with said body, said means comprising brackets mounted on the bars, extending downwardly therefrom and forming top bearings and guides for the tooth, the rear bracket having arms diverging laterally as they extend downwardly, and a shackle, a top plate secured to said bars, a depending spring secured to said plate and to the tooth, and a reinforcing rod mounted on the plate and extending downwardly in front of the foremost bar, forming a fulcrum for the tooth.

9. In a sweep rake, the combination of the head and means for fulcruming the teeth thereon between their extremities to permit oscillatory movement both vertically and laterally.

10. In a rake, the combination with the head and the teeth, the head comprising bars, of means for connecting each tooth with the head including a shackle comprising a plate connecting said bars, a spring secured at one end to the plate and at the other end to the tooth, and means adjacent one of said bars serving as a fulcrum for said tooth.

11. In a rake, the combination with the head and the teeth, of means for connecting each tooth with the head, said means comprising a shackle including a forwardly located fulcrum, and a spring on the rear of the shackle connecting the tooth with said shackle.

12. In a sweep rake having a head and substantially straight carrier teeth, the combination with the head and the teeth, of means for connecting each tooth with the head, said means comprising a forwardly located fulcrum, and means on the rear of the head to support the tooth and permit vertical movement thereof.

13. In a sweep rake having a head and substantially straight carrier teeth, the combination with the head and the teeth of means for connecting each tooth with the under side of the head, said means comprising a depending forwardly located fulcrum for the tooth and a rearwardly located member to support the rear end of the tooth and permit vertical movement of the tooth.

14. In a sweep rake having a head and substantially straight carrier teeth, the combination with the head and the teeth, of means for connecting each tooth with the head, said means comprising a fulcrum and means on the head connected with the tooth to support the same and permit vertical movement thereof.

15. In a sweep rake having a head and substantially straight carrier teeth, the combination with the head and the teeth, of means for connecting each tooth with the under side of the head, said means comprising a depending fulcrum for the tooth and a member connected with another portion of the tooth to support the same and permit vertical movement thereof.

In testimony whereof I affix my signature in presence of two witnesses.

JOSEPH H. COPE.

Witnesses:
 MAZE KIRBY,
 A. EBERT O'BRIEN.